May 14, 1935.  C. DORNIER  2,001,186
HEAT EXCHANGER
Filed May 31, 1933
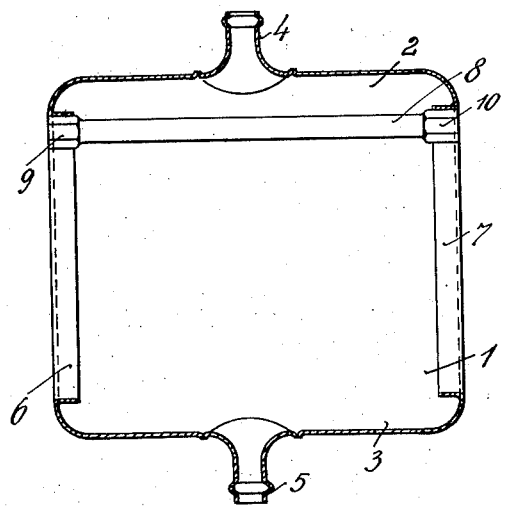
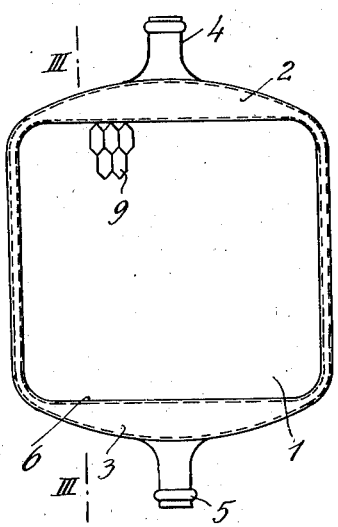
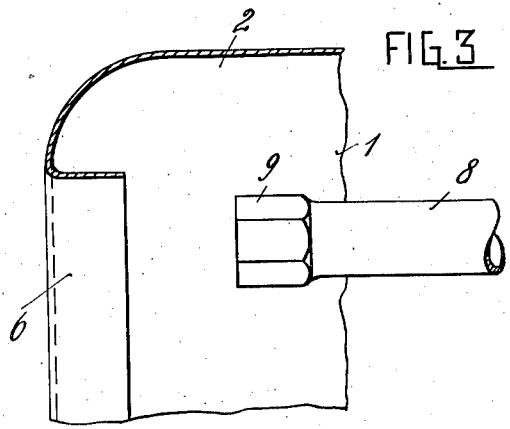
Inventor:
Claude Dornier
by Kurichaeli
Atty.

Patented May 14, 1935

2,001,186

UNITED STATES PATENT OFFICE 2,001,186

HEAT EXCHANGER

Claude Dornier, Friedrichshafen, Germany, assignor of one-half to Dornier-Metallbauten G. m. b. H., Friedrichshafen, Germany Application May 31, 1933, Serial No. 673,653
In Germany July 23, 1932

4 Claims. (Cl. 257—139)

My invention relates to heat exchangers such as radiators for power plants on aircraft, and more particularly to heat exchangers made of light metal or a light-metal alloy throughout.

Heretofore attempts to manufacture suitable radiators from light metal or a light-metal alloy have failed because no satisfactory connection could be established between the light metal body of the radiator including the frame or casing, the water chamber or chambers and the connecting pipes on the one hand and the tubes forming the radiator block proper on the other hand. It has therefore been suggested to connect the parts by beading-over without soldering or welding, but it was found that such connections are not tight.

It is an object of my invention to provide a heat exchanger which does not show these drawbacks. To this end I connect the light metal frame, water chambers and connecting pipes by welding and I coat the ends of the tubes forming the block with a metal which is closely related to and bears the same (plus or minus) sign as the light metal or light-metal alloy of the pipes in the series of electrical potential. This metal may for instance be nickel if the tubes are of pure aluminium. On this coating I arrange a layer of a metal such as tin which is suitable for soldering.

In the drawing affixed to this specification and forming part thereof a radiator embodying my invention is illustrated diagrammatically by way of example.

In the drawing

Fig. 1 is a central longitudinal section and

Fig. 2 is an end elevation of the radiator, while

Fig. 3 is a section on the line III—III in Fig. 2, drawn to a larger scale.

Referring to the drawing, 1 is the body or casing of the radiator, 2 and 3 are water chambers at its upper and lower ends, and 4 and 5 are the pipe connections for the water flowing through the radiator.

The end walls of the radiator are provided with openings and inwardly projecting flanges 6 and 7 surrounding these openings.

8 are the radiator tubes, only one of which is shown in Figs. 1 and 3. 9, 10 are the tube ends which are prismatic, as shown in Fig. 2.

The flanges 6 and 7 are coated with a metal of the kind described, such as nickel. A similar coating is applied to the prismatic ends 9 and 10 of the tubes 8, and to this coating is applied a coating of a suitable soldering metal such as tin. The tubes are assembled to form a block whose individual tubes are soldered together at their prismatic ends, the ends of the block being soldered to the flanges 6 and 7.

The parts forming the body or casing 1 and the water chambers 2 and 3 are connected by welding and the pipe connections 4 and 5 are welded to the body or casing.

I thus obtain a light metal radiator the parts of which are connected by welding and soldering.

The body or casing 1 with its water chambers 2 and 3 (any desired number of such water-distributing and water-collecting chambers being provided) and the pipe connections 4 and 5 may be made of pure aluminium or some other light metal or light-metal alloy which is weldable. The parts of the body or casing are connected to each other and to the pipe connections 4 and 5 by welding, as described. The tubes 8 forming the radiator block are also made of pure aluminium, or some other light metal or light-metal alloy, but it is not necessary that they should be of the same material as the body or casing 1. The tubes are soldered together to form the block. The coated soldering faces of the tubes extend only a short distance inwardly from their ends. This is an important feature of my invention because it has been found that tubes made of light metal or a light-metal alloy, if coated with a soldering layer, are corroded much more rapidly by water than uncoated tubes. By limiting the coating to the points where this is required, i. e., to the prismatic ends 9 and 10 of the tubes, the life of the tubes is prolonged.

The finished tube block is soldered to the frame or casing 1.

I wish it to be understood that I do not desire to be limited to the exact details of construction shown and described for obvious modifications will occur to a person skilled in the art.

I claim:—

1. A heat exchanger comprising in combination, a light metal frame, water chamber and connecting pipe, a block of light metal radiator tubes, a layer of a metal closely related to and bearing the same sign in the series of electric potential as said light metal being arranged on the ends of said tubes exclusively and a soldering metal coating said metal layer and firmly connecting the ends of adjoining tubes to one another.

2. A heat exchanger comprising in combination, a light metal frame, water chamber and connecting pipe connected by welding, a block of light metal radiator tubes, a layer of a metal closely related to and bearing the same sign in the series of electric potential as said light metal being arranged on the ends of said tubes exclusively and a soldering metal coating said metal layer and firmly connecting the ends of adjoining tubes with one another.

3. A heat exchanger comprising in combination, a light metal frame, water chamber and connecting pipe, a block of light metal radiator tubes, and a nickel layer arranged on the ends of said tubes, exclusively, soldering metal connecting the nickel layers on adjoining tubes.

4. A heat exchanger comprising in combination, a light metal frame, water chamber and connecting pipe, a block of light metal radiator tubes, and a nickel layer arranged on the ends of said tubes exclusively, a layer of tin connecting the nickel layers on the ends of adjoining tubes.

CLAUDE DORNIER.